United States Patent [19]
Arrabit

[11] 4,372,074
[45] Feb. 8, 1983

[54] ANIMAL TRAP

[76] Inventor: Pierre Arrabit, 631 20th Ave., San Francisco, Calif. 94121

[21] Appl. No.: 198,691

[22] Filed: Oct. 20, 1980

[51] Int. Cl.³ ............................................. A01M 23/04
[52] U.S. Cl. ........................................... 43/69; 43/71; 43/74
[58] Field of Search ................... 43/61, 65, 69, 70, 71, 43/72, 73, 74; 119/51 R

[56] References Cited

U.S. PATENT DOCUMENTS

| | | | |
|---|---|---|---|
| 742,953 | 11/1903 | Alphin | 43/65 |
| 886,381 | 5/1908 | Little | 43/69 |
| 915,028 | 3/1909 | Kaiser | 43/69 |
| 942,481 | 12/1909 | Brecheisen | 43/69 |
| 960,170 | 5/1910 | Harman | 43/69 |
| 995,233 | 6/1911 | Elder | 43/69 |
| 1,028,538 | 6/1912 | Brown | 43/69 |
| 1,096,387 | 5/1914 | Pezzolo | 43/69 |
| 1,727,666 | 9/1929 | Nicks et al. | 43/71 X |
| 2,766,550 | 10/1956 | Johnson | 43/69 |
| 3,604,601 | 9/1971 | Boling | 119/51 R |

Primary Examiner—James G. Smith
Assistant Examiner—Robert P. Olszewski
Attorney, Agent, or Firm—Townsend and Townsend

[57] ABSTRACT

An animal trap comprising a housing having pivotally mounted tilting doors and a receptacle to which the housing mounts. The housing includes top, bottom and side walls that form a passage extending between two open ends of the housing. Formed intermediate of the ends is an aperture in which the tilting doors are mounted, the aperture opening into the receptacle. The housing and receptacle are configured to be placed in the ground in juxtaposed relation to an exterior wall or foundation of a building and are constructed so as to remain relatively dry even in inclement weather conditions.

11 Claims, 4 Drawing Figures

U.S. Patent  Feb. 8, 1983  4,372,074
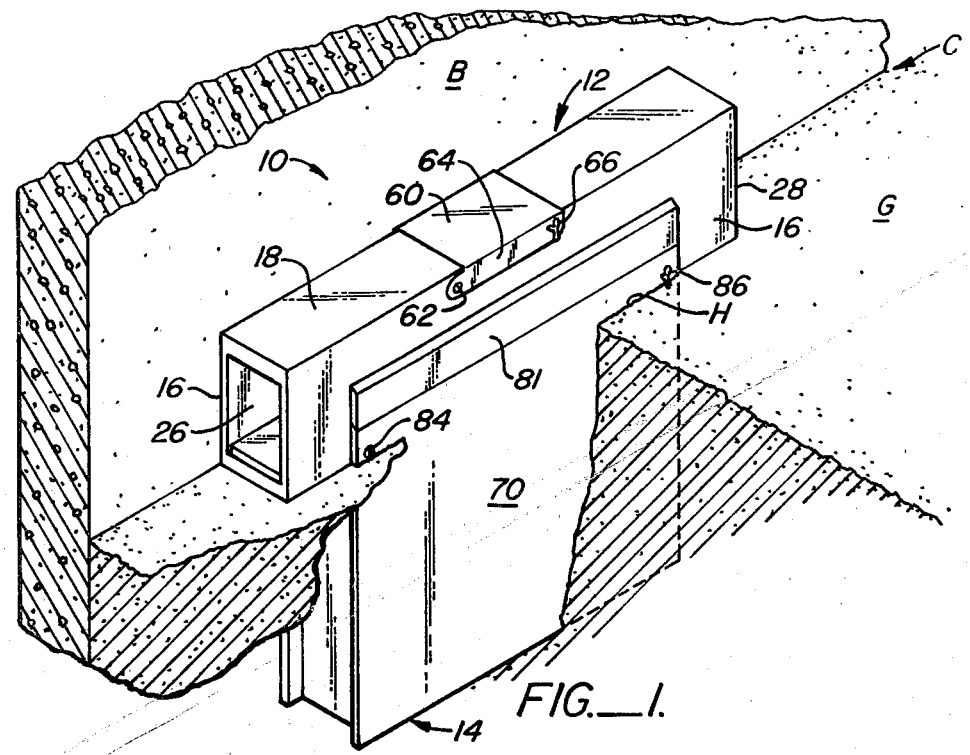
FIG._1.
FIG._2.
FIG._3.
FIG._4.

ANIMAL TRAP

The present invention is directed to an animal trap and more particularly an animal trap for use outside buildings and dwelling places for ridding the premises of small rodents such as rats and mice.

BACKGROUND OF THE INVENTION

There exists today a number of various styles and models of traps used to rid a premises of small rodents. Many such traps utilize spring biased jaws that are tripped by a baited trigger to snare or otherwise catch the intended prey. Once tripped, however, the trap must be rebaited and/or reset that is, traps of this type must be tended for efficient use.

Other models of traps resemble cages that have a specially designed entry way for one-way ingress by a rodent who seeks the bait usually placed inside the cage. If the bait is not protected, the trapped rodent will devour the bait and the cagelike trap must be "reset" by emptying its contents and placing new bait therein. Other similar traps provide a mesh or other material to cover the bait so that the entering (and subsequently trapped) rodent cannot consume the bait, and mitigate the trap's efficiency. However, the mere presence of the trap's inhabitant, viewable from outside, can operate as a debilitating factor to catching further rodents. Again, therefore, the trap must be emptied for subsequent use.

Still other traps utilize passageways fitted with tilting or trap door mechanisms that empty into buckets, barrels or the like. Rodents are attracted to the passage by bait placed proximate the tilting door mechanism. Rodents are coaxed onto the tilting doors by the bait and, when the rodent's weight reaches a certain point, the door tilts, dropping the encroaching rodent into an underlying receptacle. Examples of these kinds of traps can be seen in U.S. Pat. Nos. 886,381, 915,028, 942,481, 960,170, and 995,233. These traps also suffer certain problems: since they are adapted to be placed on a water-filled bucket or similar receptacle for retaining trapped rodents, or when used in an external environment in inclement weather conditions, the water in the trap's receptacle can operate to make this type of trap untasteful to use and, at times, inoperable. For example, the introduction of moisture in the receptacle (oft times a specified element in traps described in certain of the above referenced patents) can operate to make use and subsequent emptying of the receptacle a distasteful and undesirable operation, particularly when the trapped rodent or rodents have been resident for any length of time. Further, the water level receptacle can rise to a point that impedes the operation of the tilting doors, thereby making the trap inoperable.

The tilting door traps often use a pivoted door construction that sometimes allows a rodent encroach beyond the pivot point of the door and reach any bait placed in the trap without causing the door to tilt. Thereby, the whole purpose of the trap of defeated.

SUMMARY OF THE INVENTION

The present invention provides an animal trap, intended for use in the external environment outside building structures, that operates without the aforementioned problems found in prior art devices. The animal trap of the present invention can be constructed from a variety of inexpensive materials, making the construction of the trap itself inexpensive.

According to the present invention, therefore, there is provided an animal trap comprising a generally tubelike housing having a pair of open ends and a passage therebetween mounted to an animal receiving receptacle. The housing has formed in a bottom wall thereof an aperture which opens into the receptacle when the housing is mounted thereto. Pivotally mounted in the passage are a pair of tilting door assemblies that cover the aperture. Also mounted in the passage, proximate and above the interior ends of the tilting door assemblies, and generally intermediate the open ends, is a bait receiving container.

The housing is provided with structure that conformably mates with upward extending side wall edges of the receptacle to form a water resistant connection therebetween so that the animal receiving interior of the receptacle remains dry when the animal trap is used, even in inclement weather conditions. The housing and underlying receptacle have transverse dimentions that are substantially the same, allowing the trap to be placed so that the housing is in juxtaposed relation with a building structure wall or foundation and the ground. The receptacle is located beneath the housing in a hole in the ground provided therefor. So located, the housing is situated in the natural chute formed by the intersection between the wall or foundation of a structure and the ground often used by smaller rodents when travelling from place to place.

In the preferred embodiment, the tilting door mechanism comprises a pair of such doors mounted horizontally in end-to-end relation to one another. Each of the doors are constructed so that an interior portion of each door, extending inwardly of the pivot point, is situated parallel to but vertically below an outward extending portion of the door. So configured, the door immediately tilts under the weight of a rodent once the pivot point, which acts as a "point of no return," causing the door to project the rodent into the receptacle located therebelow.

Several advantages may readily be apparent from the above summary of the invention. Mounting the housing to the underlying receptacle in a manner that minimizes the introduction of water to the interior thereto and allows the interior of the receptacle to remain dry. Left unattended for long periods of time, the trapped contenst of the receptacle merely dry, rather than undergoing the process that occurs in the presence of moisture.

Further, the particular structure of the tripping doors used in the invention provide a positive trapping action when rodents encroach on the doors, beyond (interior of) the pivot point.

Further still, by structuring and dimensioning the animal trap of the present invention to allow one to locate the housing in the chute formed by the intersection between an exterior wall structure and the ground surface improve the trap's efficiency. Small rodents often use this natural chute to hide their furtive travels from one location to another. Placing the housing in this cute enhances the possibility of attracting the rodents attention with the bait and subsequently trapping the rodent.

For a fuller understanding of the nature, objects and further advantages of the invention, reference should be had to the ensuing detailed description taken in conjunction with the accompanying drawings.

BRIEF DESCRIPTION OF THE DRAWINGS

FIG. 1 is a perspective view of the animal trap of the present invention, illustrating its use proximate a wall structure;

FIG. 2 is a cross-sectional view of the animal trap illustrated in FIG. 1;

FIG. 3 is a partial view of the housing of the animal trap of FIG. 1, illustrating the bait receiving container and its cover; and FIG. 4 is a partial end view of the animal trap of FIG. 1, illustrating mating engagement between the housing and the receptacle.

DETAILED DESCRIPTION OF THE INVENTION

Referring to FIG. 1, there is illustrated an animal trap constructed in accordance with the teachings of the present invention and generally designated with the reference numeral 10. As shown, the animal trap 10 includes a housing 12 that is removably mounted to an animal receiving receptacle 14. The housing 12 is constructed from a pair of parallel side panels 16 are attached to and held in spaced relation by a top panel 18 and bottom sections 20 and 22. So constructed, the housing forms a passage 24 that extends between a pair of opposed openings 26 and 28 located at the ends of the housing 12.

As better seen in FIG. 2, the bottom sections 20 and 22 terminate interior of the housing 12 in opposed confronting edges 30 and 32, forming, with the lower portions of the side panels 16, an opening 34 in the bottom of the housing 12.

Pivotally mounted interior of the housing 12 are a pair of horizontally mounted tilting doors 36 and 38 of identical construction. Pivot pins 40 and 42, which extend through a throughbore formed in a center section 44 of each tilting door, are journaled to the side panels 16 to hold the tilting doors. Extending horizontally from the center section 44 of each tilting door 36 and 38, and inwardly of the housing 12, are interior end portions 46; and extending outwardly toward the openings 26 and 28 and from the center sections 44 of the pivoted tilting doors 36 and 38 are outer end portions 48.

The tilting doors 36 and 38 are mounted in the housing 12 in horizontal end-to-end relation, with the interior end portions 46 of each extending toward the other and covering the opening 34. The outer end portions 48 of each pivoted tilting door 36 and 38 are formed to have a somewhat greater thickness, relative to the interior end portions 46, to provide sufficient weight to hold the pivoted tilting doors in a horizontal position.

Each of the tilting doors 36 and 38 is formed so that the interior end portion 46 thereof is located a vertical distance below the outer end portion 48. The reason for this "stepped" feature is to effectively move the "point of no return" closer to the pivot point 40 and 42 of each tilting door. It has been found that if the end portions 46, 48 of the tilting doors are made coplanar from a single slat, rodents can, if careful, encroach upon the interior end portions and reach the bait without tilting the doors. By positioning the interior end portions 46 parallel to the outer end portions 48 of each tilting door 36 and 38, the point of no return is believed to thereby be moved closer to the pivot point 40 and 42 of each tilting door. The weight of an encroaching animal inwardly of the pivot point will cause the door to tilt sooner (as indicated in phantom for door 38 in FIG. 2), projecting the animal through the opening 34 and into the underlying receptacle 14.

Attached to, and located approximately the top panel 18 of the housing 12 at approximately the center thereof, and extending into the passage 24, is a bait container 54, preferably fabricated from a wire mesh or the like (FIGS. 2 and 3). An entry port 56 is formed in the top panel 18 to allow bait to be introduced into or removed from the bait container 54. A plugblock 58 is provided, shaped and configured to snugly fit in the entry port 56. A cover 60 is pivotally attached at 62 to the top panel 18 to cover and protect any bait located in the bait container 54 as well as the interior of the animal trap 10 during possible inclement weather conditions. To enhance protection, the cover 60 is provided with vertically depending side flanges 64. If desired, the cover 60 may be secured in its closed position by a removable fastener means 66 which can take the form of, for example, a T-head screw and appropriate screw hole 67 formed in the housing 12.

Referring now to FIGS. 1, 2 and 4, the receptacle 14 is shown as being formed from a pair of parallel side walls 70 fastened to and held spaced apart by end walls 72 and a bottom member 74. The upper terminal edge 76 of each side wall 70 extends vertically above the edges 78 of the end walls 72 (FIG. 4) to form a recess 80 that receives the housing 12. In addition, the terminal edges 76 of the side walls 70 are beveled outwardly, as indicated in FIG. 4. A pair of longitudinally extending slats 81 are affixed to the side panels 16 of the housing 12 having lower edges 82 that are correspondingly beveled inwardly toward the side panels 16 to provide mating engagement with the beveled edges 76 of the side walls 70 when the housing 12 is mounted to the receptacle 14. This mating engagement forms a moisture-resistant seal to minimize the introduction of water into the receptacles 14 during inclement weather conditions.

When the housing 12 is mounted to the receptacle 14, appropriately structured fasteners 84, 86 are used in conjunction with concentric apertures formed in the side walls 70 of the receptacle 14 and the corresponding bottom sections 20, 22 of the housing 12 to secure the housing to the receptacle. If desired, the fastener 86 may be constructed so that it is easily removable to allow the end of the housing 12 having the opening 28 to be tilted upward about the fastener 84 for easy emptying of the content of the receptacle 14.

The animal trap 10 of the present invention is constructed for use in areas that are outside building structures. Further, it is expected that once baited, the animal trap 10 can be left unattended for a relatively long period of time (e.g., a week or more) in all types of weather conditions. Accordingly, features have been provided to inhibit the introduction of water to the receptacle 14 of the animal trap 10 which could make use of the trap particularly unpleasant and distasteful, as well as impede operability as discussed above with prior art traps. These features include the beveled edges 76 and 82 for mating and water resistant engagement between the upper edges of the side panel 70 and the slats 80, as well as covering the bait container 54 with the plugblock 58 and pivoted cover 60.

When used outside, it has been found that smaller rodents tend to scurry or travel along the natural chute C formed by the intersection between the ground surface G and the vertically extending wall or foundation B of a building structure (FIG. 1). Accordingly, most efficient use of the animal trap 10 around building structures is as follows: A hole H is formed in the ground G adjacent the building wall B for receiving the receptacle 14. The hole located relative to the building wall B to place the housing 12 adjacent to, if not contiguous with, the vertical surface of the building wall B. The dimensions of the hole H should be sufficient to receive the receptacle 14, yet allow the housing 12 to rest on the ground surface G.

With the animal trap 10 constructed and assembled as described above and inserted in the hole H so that the housing 10 is oriented substantially parallel to the natural chute C formed by the building wall B and ground G, bait can be placed in the bait container 54 and covered by the plug block 58 and cover 60. The animal trap 10 is now located to better encounter and attract small rodents whose furtive movements from one location to another will be more apt to be along the chute C. Attracted by the bait held in the bait container 54, a rodent will enter the housing 12 via one of the openings 26 or 28. When the rodent's encroachment into the passage 24 is beyond the pivot point 40 or 42 of the respective tilting doors 36 and 38, the door will tilt about its pivot point (as indicated in phantom in FIG. 2 for tilting door 38), projecting the encroaching rodent into the underlying receptacle 14. The pivoted tilting door then returns to its horizontal position, leaving the rodent trapped in the receptacle 14.

Preferrably, the receptacle 14 should contain an insecticide. In addition to hastening dispatch of any trapped rodent, the insecticide will destroy any possible disease carrying insects that may be found on the rodent. If desired, a substance poisonous to the rodent for which the animal trap 10 is used may be placed in the recepticle 10 to hasten dispatch.

It has been found by using an animal trap constructed in accordance with the teachings set forth above, that when left unattended for several weeks, even in inclement weather conditions, the recepticle 14 remains dry. Rodents that have been trapped in the recepticle for some time tend to dry up so that their disposal is no where near as distasteful as with certain other prior art animal traps which allow the entry of moisture.

While the above provides a full and complete disclosure of the preferred embodiment of the invention, various modifications, alternate constructions and equivalents may be employed without departing from the true spirit and scope of the invention. Therefore, the above description and illustrations should not be construed as limiting the scope of the invention which is defined by the appended claims.

I claim:

1. An animal trap adapted to be located on a ground surface and exterior of a building and in adjoining relation to a vertical wall of said building, comprising:
    a receptacle having an animal receiving chamber, a pair of vertically extending side walls, front and end walls connecting said side walls and a bottom, said walls and bottom being substantially water impervious, said receptacle having an open top providing an entry to said chamber;
    an elongate, tubular housing mounted to said receptacle and covering said entry, said housing having wall portions defining a pair opposed openings and a top, a passage extending between said openings, a first aperture for communication between said passage and said animal receiving chamber, and a second aperture formed in said top in generally opposed relation to the first aperture;
    bait receiving means mounted in said passage and in communicating relation to the second aperture to allow bait to be received by said bait receiving means through said second aperture;
    a cover member moveably attached to said housing for removeably covering the second aperture, the cover member extending past the periphery of said second aperture, the lateral edges of the cover member extending downwardly past the second aperture to provide water resistant protection for said second aperture;
    a pair of spaced apart grooves formed in the outer surface of the top of the housing, said grooves extending transverse said housing, at least a portion of each of said grooves underlying at least a portion of the longitudinal edges of said cover member to help prevent water from entering said second aperture;
    a pair of substantially coplaner door members pivotedly mounted in horizontal end-to-end relation in said passage, said door members having interior end portions extending toward one another and being moveable from a first position overlying and covering said aperture to a second position extending through said aperture and said entry and into said chamber; and
    means attached to said housing and configured to conformably mate with said edge portions of said receptacle, said edge portions being correspondingly configured to produce a water resistant seal therebetween.

2. The animal trap of claim 1, wherein said housing and said receptacle include corresponding transverse dimensions adapted to allow said housing to be placed in said adjoining relation to said building wall at the level of said ground surface.

3. The animal trap of claim 1, said water resisting means including a pair of parallel elongate slats attached to an outer surface of said housing and extending longitudinally thereof, each of said slats having a lower beveled edge forming an inverted V with said housing, said edge portions of said recepticle being correspondingly configured for mating engagement with said bevel edges of said slats.

4. The animal trap of claim 1, wherein said bait receiving means includes a wire mesh attached to said housing and extending into said passage, said wire mesh being configured and adapted to hold animal bait.

5. The animal trap of claim 4, including a cover member pivotally attached to the outer surface of said housing for removably covering said second aperture.

6. The animal of claim 1, wherein said housing is removably mounted to said receptacle.

7. The animal trap of claim 1, wherein each of said door members includes a center section and interior end exterior end portions extending in opposite directions from said center section, said interior end portions being situated parallel with and vertically below said exterior and portions.

8. The animal trap of claim 7, wherein said door members are journaled to said passage at said mid sections thereof, and wherein each of said exterior end sections are formed with increased dimensions relative to the interior end portions, to provide weighting to maintain said door member in a substantially horizontal position.

9. The animal trap of claim 1, wherein said housing is rectangular in section.

10. The animal trap of claim 3, the receptacle including an insecticide in said animal receiving chamber.

11. The animal trap of claim 1, including a plug member configured and dimensioned to removably fit in said second aperture and be covered by said cover member.

* * * * *